H. PILLING.
VALVE GEAR FOR RECIPROCATING STEAM ENGINES.
APPLICATION FILED JAN. 29, 1917.

1,345,232. Patented June 29, 1920.
4 SHEETS—SHEET 1.

Witnesses:
M. E. McDade
C. J. Kesler

Inventor
Henry Pilling,
by James L. Norris,
Attorney.

H. PILLING.
VALVE GEAR FOR RECIPROCATING STEAM ENGINES.
APPLICATION FILED JAN. 29, 1917.
1,345,232.
Patented June 29, 1920.
4 SHEETS—SHEET 4.
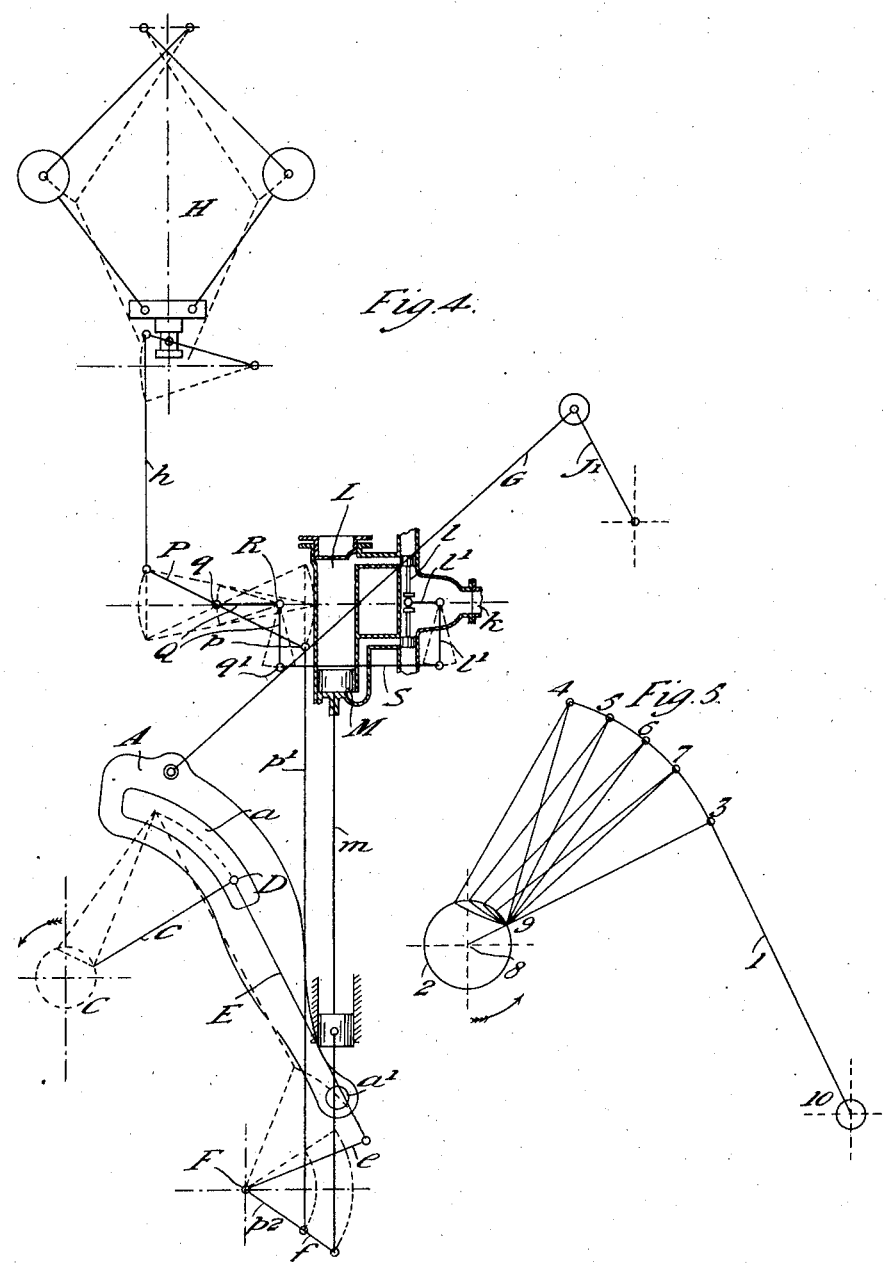

UNITED STATES PATENT OFFICE.

HENRY PILLING, OF CHORLTON-CUM-HARDY, ENGLAND.

VALVE-GEAR FOR RECIPROCATING STEAM-ENGINES.

1,345,232.

Specification of Letters Patent. Patented June 29, 1920.

Application filed January 29, 1917. Serial No. 145,208.

*To all whom it may concern:*

Be it known that I, HENRY PILLING, a subject of the King of Great Britain, residing in Chorlton-cum-Hardy, England, have invented certain new and useful Improvements in Valve-Gears for Reciprocating Steam-Engines, of which the following is a specification.

This invention relates to improvements in valve gear for reciprocating steam engines of the type in which means are provided for varying the cut-off to suit variations in the load. The invention, while applicable to all types of reciprocating engines, is primarily designed for use with uniflow engines in which it is desirable to be able to give a very early cut off. Hitherto, most uniflow engines have run at a comparatively high speed and have been adapted for rope or belt driving or for direct coupling to such machinery as electric generators.

The valve gears used with uniflow engines usually require a very powerful governor control on the mechanism which alters the cut-off, and it is extremely difficult to provide this powerful control by means of an ordinary vertical revolving governor of the Watt or Porter type, and consequently this has been effected generally by the use of a horizontal lay shaft centrifugal governor so constructed as to prevent the jerk from the eccentric, when actuating the valve, adversely affecting or unduly influencing the governor.

Lay shaft governors, however, are not free from the influence of gravity, and consequently when running at slow speeds the weights are liable to flop in and out to a prejudicial extent. For this reason, engines having lay shaft governors have had to run at a high speed. Another reason which has prevented them from running at slow speeds has been the difficulty of arranging a suitably powerful governor control.

The object, therefore, of the present invention is to provide a valve gear which while working accurately and efficiently at high speeds will also, while working just as accurately and efficiently, permit the engine to be run at the slowest speed at which an engine can reasonably be expected to turn. It is, for instance, designed to provide a gear which will be applicable to slow speed rolling mill engines the load on which varies very greatly and very quickly.

The invention is adapted to be employed for operating almost any known form of valve, and the operating rod of the gear may be coupled direct to the spindle of the valve either of piston, slide, rotary or other form, or it may operate it indirectly through a cam plate or other operating means attached to the valve.

The invention relates to that type of valve gear comprising an arm or lever mounted on a fixed pivot and having a slot therein, a block slidable in said slot, means for sliding said block in the slot, either automatically or otherwise, according to the load on the engine, means connecting the block with the eccentric strap or crank for the purpose of rocking said arm or lever, and means connecting the arm or lever to the valve.

It consists essentially in a valve gear of the type described in which the alteration of the position of the block in the slot in the arm or lever varies appreciably both the angle and position of oscillation of said arm or lever and with it the travel and relative movement of the valve, with or without also varying the lead of the valve.

The invention will be described with reference to the accompanying drawings, which, by way of example, show a valve gear constructed according to the invention as applied to the operation of a double beat valve in connection with an engine of uniflow type.

Fig. 4 is a diagrammatic view showing the connections of the valve gear and governor mechanism;

Fig. 5 is a valve diagram indicating the method of setting the gear.

Figure 1:
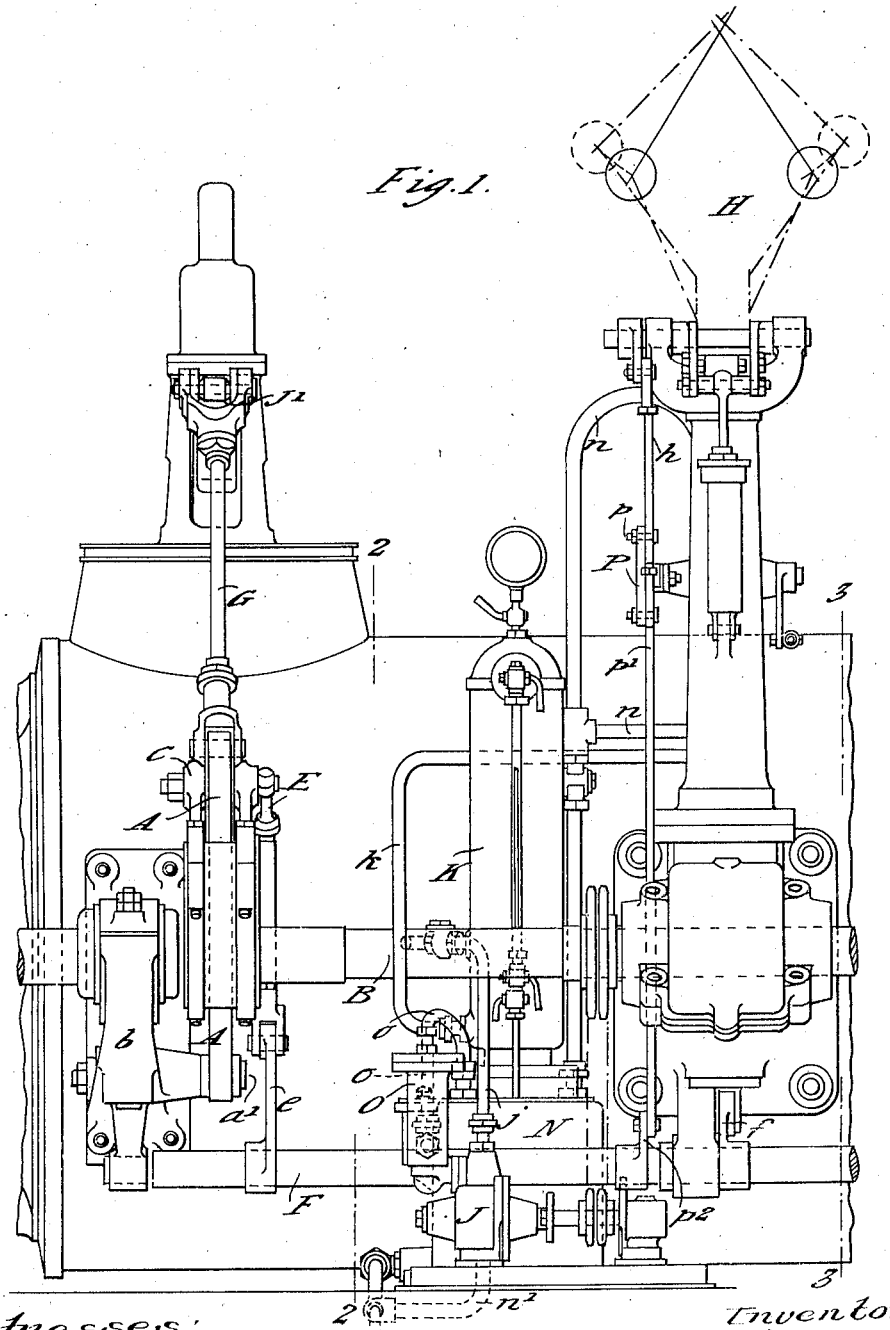
Figure 1 is an elevation of part of the engine showing the valve gear at one end of the engine and the governor gear.
Figure 2:
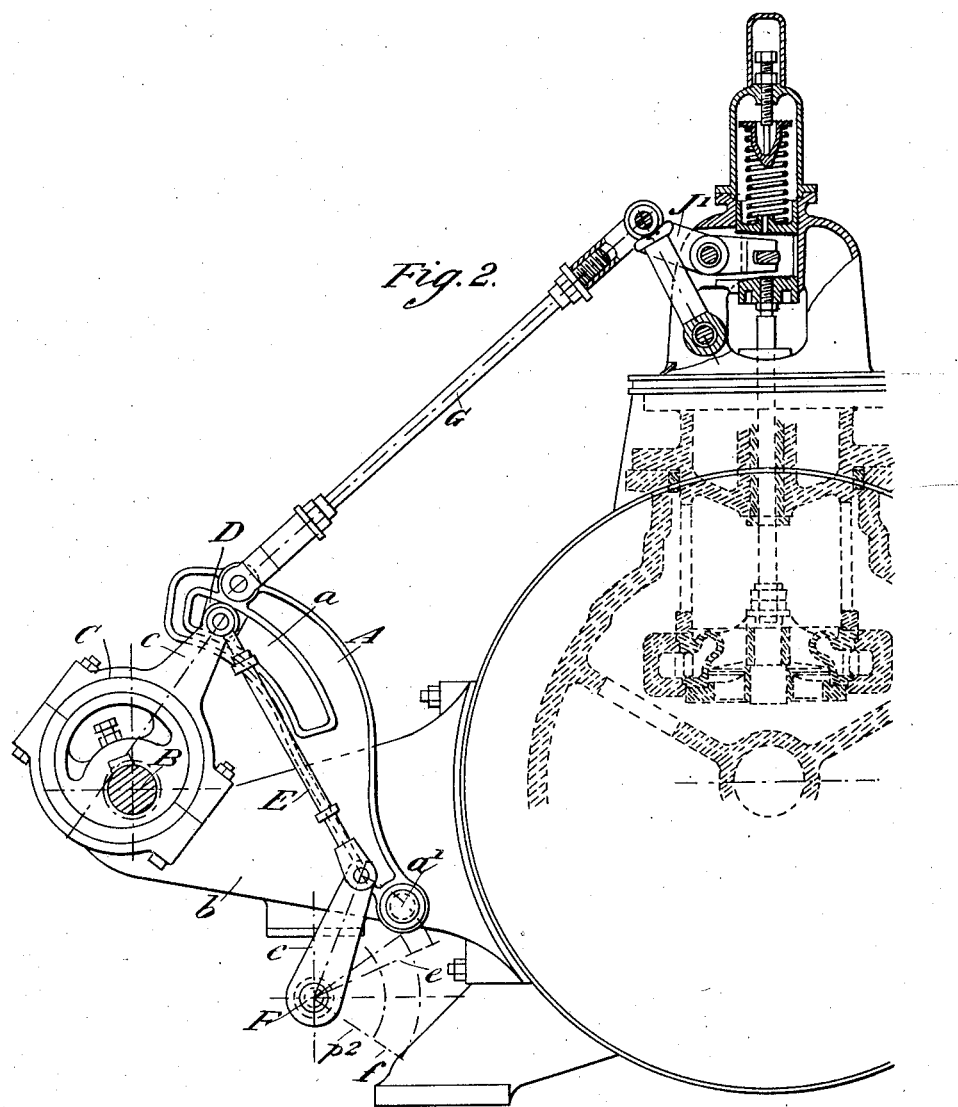
Fig. 2 is a section on line 2—2 of Fig. 1 showing a side view of the valve gear.

The valve gear as shown in Figs. 1, 2 and 4 comprises an arm or lever A of any convenient length and shape which is mounted on a pivot *a'* upon the frame of the engine, or a bracket *b* thereon which may also carry the lay shaft B so that it may be oscillated thereon as hereinafter described. In the lever A is formed a curved slot *a* preferably forming part of a circle struck from a center upon or adjacent to the crank circle of the valve eccentric or crank C upon the lay shaft.

In the slot is mounted a block D slidable therein and this block is pivotally connected with the end of the rod $c$ of the eccentric C, so that, as the eccentric rotates, the block D, and with it the arm or lever A are rocked or reciprocated. Also pivotally attached to the block D is a rod or the like E adapted to be operated, either automatically or otherwise, so as to slide the block along the slot $a$ to varying positions according to the load on the engine. Such rod E may be operated in any suitable manner by the governor of the engine. It may, for instance, as shown, be connected to the end of a lever $e$ mounted on a shaft or spindle F adapted to be rocked through varying angles according to the load under the action of the governor H.

This lever $e$ is preferably so arranged that its outer end is adapted to oscillate as nearly as possible equally on both sides of the pivot $a^1$ of the main arm or lever A and as little removed from such pivot as possible, the object being to obviate any appreciable movement of the block D in the slot $a$ when the main arm or lever A is rocked.

In certain cases, the rod for sliding the block may be operated by hand.

Pivotally attached to any suitable point of the arm or lever A is a rod G adapted at the other end to be attached to the valve, or, as shown, to the valve operating means J′, and rod G, as the arm or lever A is rocked to and fro by the eccentric C, actuates said means J′ to operate the opening or closing of the valve.

An essential consideration in the construction of the valve gear is the ratios between the length of the curved slot, the length of the eccentric arm and the diameter of the eccentric travel circle which must be so adjusted as to give the desired variation in the angle and position of oscillation of the end of the eccentric arm according to its position in the curved slot.

For instance, the ratios should preferably be such that the length of the slot in the pivoted arm or lever is not less than half the length of the eccentric arm, and the diameter of the eccentric travel circle is not less than one quarter of the length of said eccentric arm.

The positions of oscillation of the lever A with the block D at various positions in the slot $a$ must be such that they are appreciably different, and only coincide in part.

Suitable ratios for one type of valve are as shown in the drawing.

Taking the diameter of the eccentric travel circle as 1, the eccentric arm may be $2\frac{3}{4}$ and the length of the possible travel of the block in the slot may be 2. With these ratios a change in the angular position of the eccentric arm of about 36° is secured with a latest cut off of $\frac{1}{8}$ stroke when the block is moved from one end of the slot to the other.

A suitable method of operating the rocking lever $e$ or its spindle F to slide the block D in the slot $a$ of the main lever A is by means of a servo-motor, the operation of which is regulated by the governor of the engine. For instance, an ordinary Porter or other governor may be arranged to operate a valve which in turn actuates a small hydraulic motor cylinder, this cylinder being supplied with pressure fluid by means of a pump worked from the lay shaft of the engine. Such a combination is indifferent to speed, has ample power and can, therefore, be applied to a large engine where great force is required in the governor gear, and also to engines which run at the slowest speeds at which an engine can reasonably be expected to turn.

It will be seen that as the position of the block is varied in the slot, the angle and the position of oscillation of the arm or lever, and therefore the travel and relative move ment of the valve, will also be varied.

Figure 3:
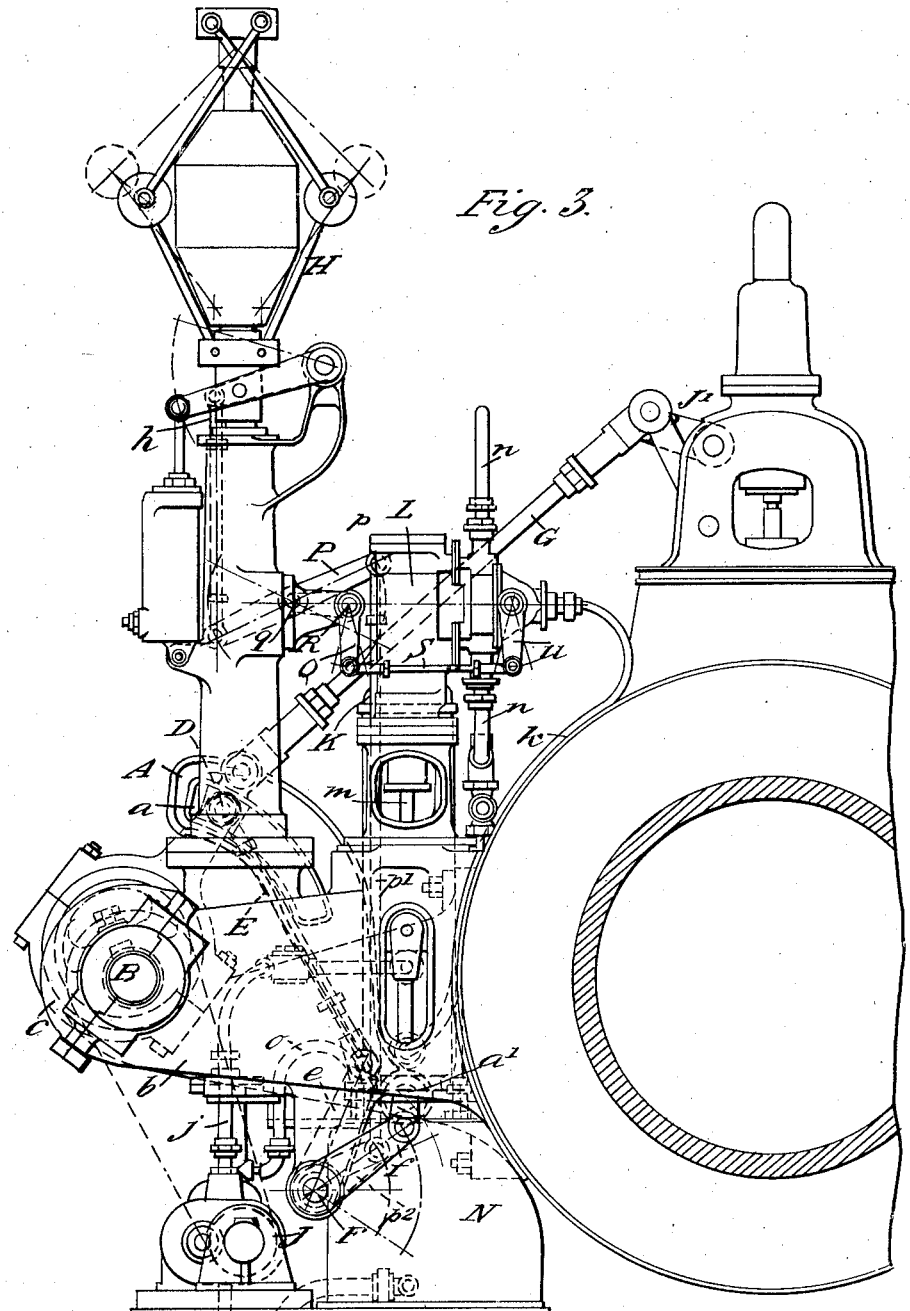
Fig. 3 is a section on line 3—3 of Fig. 1; showing a side view of the governor gear.

Such a system of governing as just described is illustrated in the drawings, see particularly Figs. 1, 3 and 4. A hydraulic, oil or other fluid pump J, driven from a moving part of the engine, for instance the lay shaft B, as shown, forces water, oil or other liquid through the pipe $j$ into the pressure vessel K from which the pipe $k$ leads to the valve $l$ of the hydraulic, oil or like relay cylinder L, the piston M of which is connected by means of the connecting rod $m$ with the lever or arm $f$ on the shaft or spindle F. The exhaust from the relay cylinder L passes by the pipes $n$ to the oil or like reservoir N from which the pump J draws its supply by means of the pipe $n^1$. The pump J is provided with an escape valve O adapted to permit the return of the motive fluid to the reservoir N by the pipe $o$ when the pressure in the pressure vessel K reaches a predetermined limit.

The valve $l$ of the relay cylinder L is operated from the governor H by the mechanism now to be described.

Operated by the rise and fall of the governor H is a rod $h$, the free extremity of which is pivoted to one end of a floating lever P, the other end of which is pivoted at $p$ to one end of a second rod $p^1$, the other end of which is articulated to the lever or arm $f$ as shown, or to a separate lever $p^2$ keyed on the shaft or spindle F. A bell crank lever Q mounted on the fixed pivot R is pivotally connected at one end $q$ to a point more or less central in the floating lever P, and the other end $q^1$ of the bell crank is pivoted to a link S the other end of which is connected to the operating lever $l^1$ of the valve $l$.

The operation of the governor and valve gear will be more clearly seen from Fig. 4 of the drawings, in which the full lines represent the top position of the governor and the early cut-off position of the valve gear, and the dotted lines the low position of the governor and the late cut-off position of the valve gear, and is as follows:—

Supposing the speed of the engine to rise and the governor H to lift it raises with it the rod $h$ which causes the end of the lever P to which it is connected also to be raised. This swings the whole of the lever P about its connection $p$ to the rod $p^1$ which is for the moment a more or less fixed point. The raising of the floating lever P causes the bell crank lever Q to be swung around on its pivot, drawing the link S and the valve lever $l^1$ with it. This raises the valve and admits the pressure liquid into the relay cylinder L above the piston which is thus forced downward. The downward movement of the piston forces down the connecting rod $m$ and the lever $f$ rotating the shaft or spindle F; this in its turn draws down the rod $p^1$ which lowers the pivot $p$ at the one end of the floating lever P which now swings downward around the, for the time being, more or less fixed connection to the rod $h$; this swings the bell crank Q in the opposite direction and cuts off the supply of pressure fluid to the cylinder L. In the meantime, the rotation of the shaft F has caused the block D in the slot $a$ in the arm A to be slid along the slot to such a position that when the arm A is rocked by the eccentric C the cut-off will be earlier so as to reduce the period of admission of steam to the engine to a degree more or less corresponding to the increase of the speed of the engine above the normal.

The mechanism operates in an exactly similar manner but contrary direction when the speed of the engine falls.

In setting the valve gear the position of the sliding block D corresponding to earliest cut-off may be either when it is nearest to the pivot $a$ of the arm or lever A, or when it is farthest therefrom. When it is nearest thereto, as shown in the drawings, the angular movement of the lever A and, therefore, the total travel of the valve driving rod G is greatest at earliest cut-off and this is an advantage where very sensitive governing at early cut-off is required.

Fig. 5 is a valve diagram which illustrates the setting of the valve gear shown in the other figures of the drawing. This is accomplished in the manner described below. The slotted arm or lever A is indicated at 1, the upper curved portion of which represents the slot therein, and the circle 2 indicates the crank circle of the eccentric C. 3 indicates the position of the block D in the slot $a$ at earliest cut-off, and 4 indicates its position at latest cut-off. Positions 5, 6 and 7 indicate intermediate positions of the block. If a line, as shown, is drawn from position 3 to the center 8 of the circle 2 it cuts this circle at point 9. In the arrangement shown the point 9 is the center from which the curve of the slot $a$ is generated with a radius equal in length to the line 9—3. With the eccentric rotating in the direction indicated by the arrow it is also arranged that when the center of the eccentric reaches point 9 admission of steam shall commence for every position of the block D in the slot. That is to say, the valve rod G with lever 1 in the position shown is so adjusted that at this position the valve just does not open. This point 9 is, therefore, called the lead point, and as the curve of slot $a$ is struck from this point it is obvious that the lead will always be the same whatever the position of block D in the slot; that is to say, whatever the load on the engine.

If now with radius equal to line 9—3 circles be drawn cutting the eccentric circle 2 with centers respectively at 3, 4, 5, 6 and 7, each of these circles will pass through point 9 but their other points of intersection of the circle 2 will vary and will indicate the point of travel of the center of the eccentric at which the steam will be cut off for the corresponding position of the block D in slot $a$.

By suitably choosing the angle of advance of the eccentric with reference to the engine crank shaft. the position 9 can be made to correspond with the engine dead center. In that case the engine works with zero lead at all values of the cut-off. If the lead point 9 is arranged to be slightly before the engine dead center the engine will have a corresponding amount of lead, which will be the same at all values of the cut-off. If so desired, the engine can be arranged to give negative lead.

It will be obvious that by moving the center of the curve of slot $a$ to one side or other of line 3—9—8, or by placing it inside or outside circle 2 the lead can be varied for varying positions of cut-off. The same result can be produced by adjusting the position of the fulcrum 10 of lever 1.

It is generally preferable that, as shown, the center of curvature of the slot should be on the side of the eccentric circle 2 nearer the lever 1, as in this way a greater valve opening is obtained for a given travel of valve though this is not in any way essential.

Having thus described the nature of the said invention and the best means I know of carrying the same into practical effect, I claim:—

1. Means for varying the time during which a steam inlet valve of a reciprocating engine is open while maintaining a constant lead for the valve, comprising in combination a pivoted arm, a shaft on which a member moves in a circular path, a slot in said arm in the form of a circular arc struck from a center approximately on a point of said circular path, a block in said slot connected to said member and adapted to rock said pivoted arm, a connecting rod pivoted to said slotted arm and operatively connected to said valve and means for moving said block in said slot according to the load on the engine.

2. Means for varying the time during which a steam inlet valve of a reciprocating engine is open while maintaining a constant lead for the valve, comprising in combination a pivoted arm, a shaft on which a member moves in a circular path, a slot in said arm in the form of a circular arc struck from a center approximately on a point of said circular path, a block in said slot connected to said member and adapted to rock said pivoted arm, a connecting rod pivoted to said slotted arm and operatively connected to said valve, a lever mounted on a shaft and a rod connecting said block with said lever, said lever being adapted to be rocked through approximately equal angles on either side of the line joining the center of the shaft with the pivot of said arm.

In testimony whereof I have signed my name to this specification in the presence of two subscribing witnesses.

HENRY PILLING.

Witnesses:—
W. T. WILSON,
FRANK FOSTER.